(12) United States Patent
Togashi

(10) Patent No.: US 11,375,075 B2
(45) Date of Patent: Jun. 28, 2022

(54) TEMPERATURE BASED CONTROL FOR DOCUMENT READING APPARATUS

(71) Applicant: CANON KABUSHIKI KAISHA, Tokyo (JP)

(72) Inventor: Kazunori Togashi, Tiride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/092,021

(22) Filed: Nov. 6, 2020

(65) Prior Publication Data

US 2021/0144270 A1 May 13, 2021

(30) Foreign Application Priority Data

Nov. 12, 2019 (JP) .............................. JP2019-204882

(51) Int. Cl.
*H04N 1/04* (2006.01)
*H04N 1/00* (2006.01)

(52) U.S. Cl.
CPC ....... *H04N 1/00814* (2013.01); *H04N 1/0057* (2013.01); *H04N 1/00933* (2013.01); *H04N 1/00997* (2013.01)

(58) Field of Classification Search
CPC ............. H04N 1/00814; H04N 1/0057; H04N 1/00933; H04N 1/00997; H04N 1/024
See application file for complete search history.

(56) References Cited

U.S. PATENT DOCUMENTS 6,043,906 A * 3/2000 Kikuchi ............. H04N 1/00976
358/475
2009/0316231 A1 * 12/2009 Shibahara .......... H04N 1/00904
358/475

FOREIGN PATENT DOCUMENTS

JP 2007-110609 A 4/2007

* cited by examiner

*Primary Examiner* — Moustapha Diaby
(74) *Attorney, Agent, or Firm* — Canon U.S.A., Inc. IP Division

(57) ABSTRACT

In a case where a temperature detected by a detector is greater than a threshold, one or more processors controls a light source not to emit light and stops conveyance of a document by a conveyance unit. In a case where a predetermined amount of time has elapsed from when the one or more processors controls the light source not to emit the light, the one or more processors controls the light source to emit the light and starts conveyance of the document by the conveyance unit, regardless of a detection result of the detector.

17 Claims, 5 Drawing Sheets

TEMPERATURE BASED CONTROL FOR DOCUMENT READING APPARATUS

BACKGROUND OF THE DISCLOSURE

Field of the Disclosure

The aspect of the embodiments relates to a document reading apparatus that reads a document while illuminating the document.

Description of the Related Art

In the art of document reading apparatuses that read documents, it is known that reading documents continuously for a long period of time causes the amount of heat from the light source emitting light to the document to increase. When the amount of heat increases, the document reading apparatus may become unable to operate normally. Japanese Patent Laid-Open No. 2007-110609 describes a configuration in which a thermistor attached in direct contact with a glass tube of a xenon lamp detects a temperature, an alarm is output when the temperature is T1 or greater, and the xenon lamp is turned off when the temperature is T2 or greater. Also, Japanese Patent Laid-Open No. 2007-110609 describes that the xenon lamp is turned back on when the temperature is T3 of less (T3<T1<T2).

A member with a relatively large heat capacity such as a glass tube changes temperature gradually. Thus, it may take a long time for the temperature detected by the thermistor to decrease from T2 to T3 or less. In a similar manner, in an example in which the temperature of a light-emitting element provided on a printed circuit board is detected by a thermistor mounted to the printed circuit board, the heat capacity of the printed circuit board may cause the temperature detected by the thermistor to decrease slowly. This makes it possible that, even when the temperature of the light source has decreased to a temperature at or below T3 at which normal operation is possible, the temperature detected by the thermistor is higher than T3. In other words, with the configuration, such as that of Japanese Patent Laid-Open No. 2007-110609, in which document reading is restarted on the basis of the temperature detected by a thermistor, even when the light source temperature has decreased to at or below T3 and the light source may be turned on again, document reading may not be restarted due to the detected temperature being higher than T3. This results in a decrease in the productivity of the document reading apparatus.

SUMMARY OF THE DISCLOSURE

The aspect of the embodiments provides a document reading apparatus comprising the following elements. A conveyance unit is configured to convey a document along a conveyance path. A light source is configured to emit light. The light source is provided on a substrate. A sensor includes a light-receiving element that receives light emitted from the light source and reflected by the conveyed document. One or more processors is configured to generate image data indicating an image of the document based on an output signal of the sensor. A detector is provided on the substrate, and is configured to detect a temperature of the light source. The one or more processors is configured, in a case where the detected temperature is greater than a threshold, to control the light source not to emit the light and to stop conveyance of the document. The one or more processors is configured, in a case where a predetermined amount of time has elapsed from when the one or more processors controls the light source not to emit the light, to control the light source to emit the light and to start conveyance of the document, regardless of a detection result of the detector.

Further features of the disclosure will become apparent from the following description of exemplary embodiments (with reference to the attached drawings).

DESCRIPTION OF THE EMBODIMENTS

Figure 1:
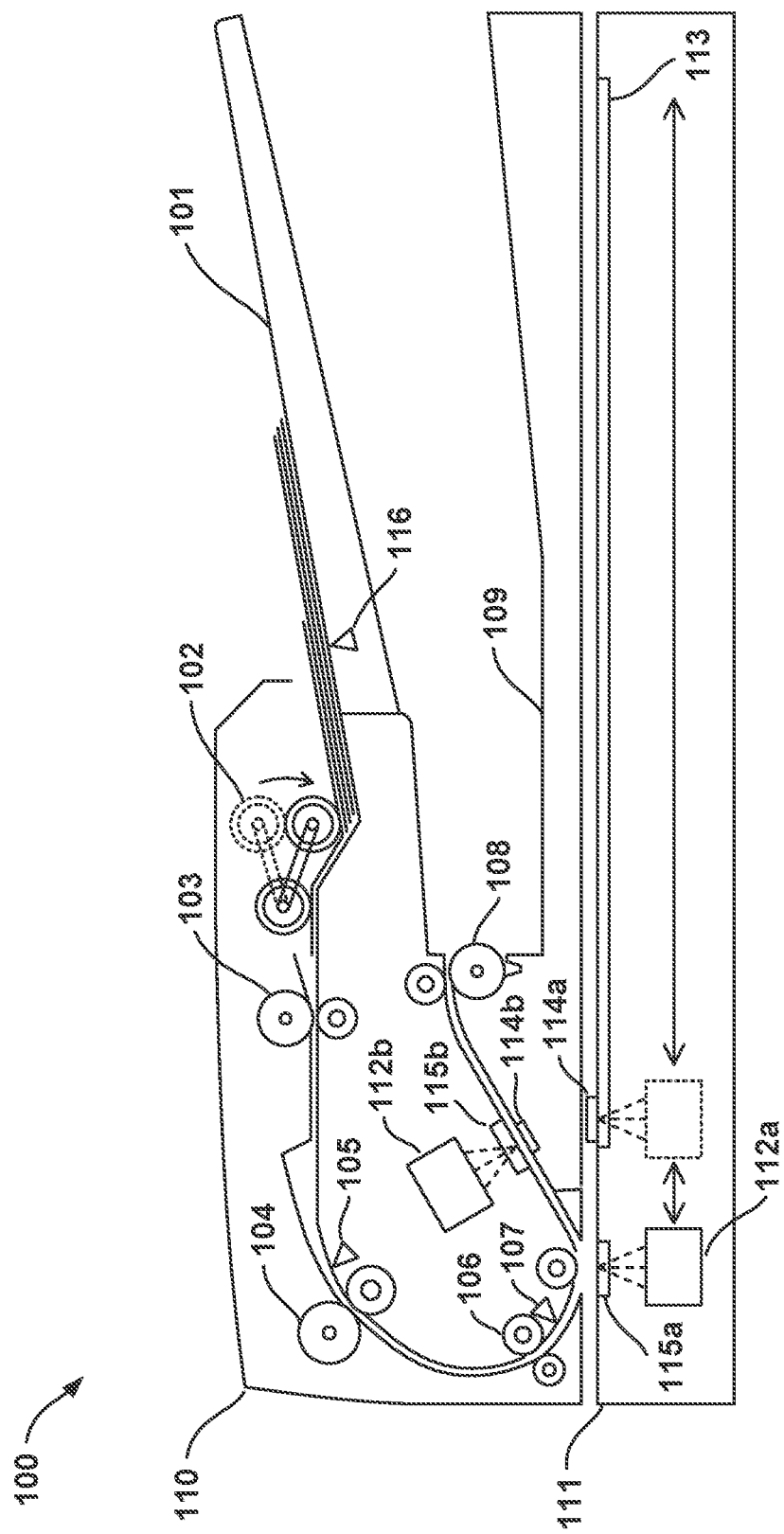
FIG. 1 is a diagram for describing a document reading apparatus.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Mechanical Configuration of Document Reading Apparatus

A document reading apparatus 100 illustrated in FIG. 1 includes an automatic document feeder (ADF 110) and an image reader 111. The document reading apparatus 100 has a feed reading mode in which the document is read as it is conveyed and a fixed reading mode in which the document is read while placed on a document platen glass 113. The document platen glass 113 is a transparent member.

When a document placed on a document tray 101 is detected by a document placement sensor 116, the document reading apparatus 100 moves the pickup roller 102 down into contact with the document. Then, the document reading apparatus 100 rotates a pickup roller 102 and conveys the document toward a separation roller 103.

The separation roller 103 is a roller that separates a single document from a plurality of documents and sends the single document to a conveyance path. A registration roller 104 is a roller that corrects the skew of the conveyed document. A registration sensor 105 is a sheet sensor that detects the arrival of the leading end of the document. The registration roller 104 remains inactive until a predetermined amount of time has elapsed from when the leading end of the document was detected by the registration sensor 105. Accordingly, the leading end of the document is brought into contact with the registration roller 104 and made parallel with the registration roller 104. In this way, the skew of the document is corrected. The document reading apparatus 100 rotates the registration roller 104 and conveys the document reading apparatus 100 further downstream.

A lead roller 106 rotates, conveying the document at a predetermined speed. In this way, the document passes a document read position at the predetermined speed. A lead sensor 107 is disposed near the lead roller 106. The lead sensor 107 is a sheet sensor that sets the timing for when to start document reading. When a predetermined amount of time has elapsed from when the leading end of the document was detected by the lead sensor 107, a reading unit 112*a* starts reading the document. The reading unit 112*a* may be referred to as a carriage.

The reading unit 112*a* has two reading modes, a feed reading mode and a fixed reading mode. The reading unit 112*a* is provided internally with a line sensor in which photoelectric conversion elements are provided side by side in a direction orthogonal to the conveyance direction of the document, a reflection mirror, an imaging lens, a light source, and the like. In either the feed reading mode or the fixed reading mode, the reading unit 112*a* moves to a position under a reference white plate 114*a*, reads the reference white plate 114*a*, and generates a shading correction coefficient. In the feed reading mode, the reading unit 112*a* moves to a position under a feed reading glass 115*a*, comes to rest, and here reads a first surface of the document being conveyed via the feed reading glass 115*a*. In the fixed reading mode, the reading unit 112*a* reads the document placed on the document platen glass 113 while moving under the document platen glass 113.

The ADF 110 includes a reading unit 112*b* that reads a second surface of the document conveyed along the conveyance path. The reading unit 112*b* reads a reference white plate 114*b* via a feed reading glass 115*b* and generates a shading correction coefficient when the document has not passed the feed reading glass 115*b*. The reading unit 112*b* is also provided internally with a line sensor, a reflection mirror, an imaging lens, a light source, and the like. A sheet discharge roller 108 discharges the document to a sheet discharge tray 109.

Electrical Configuration of Document Reading Apparatus

Figure 2:
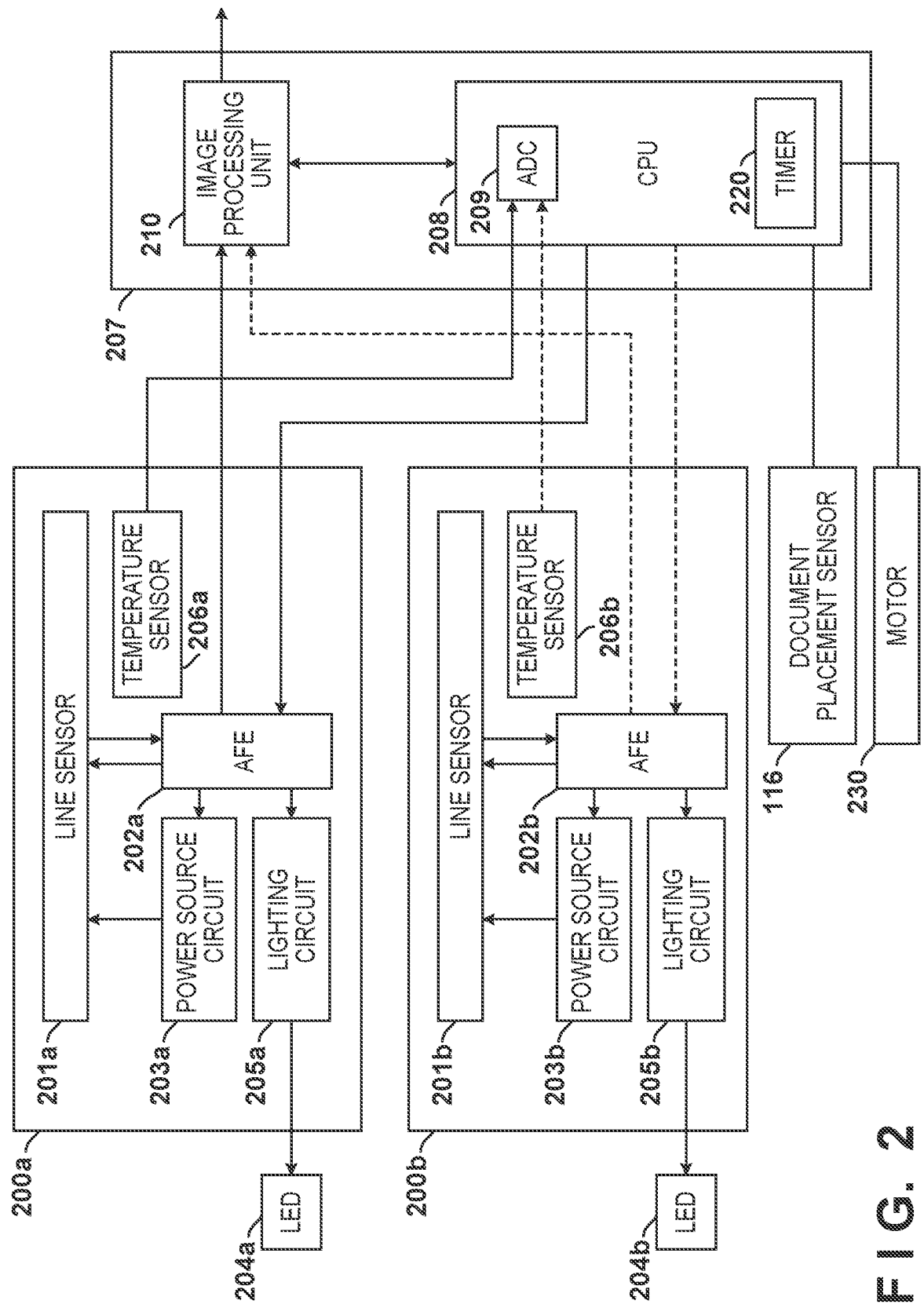
FIG. 2 is a block diagram of a document reading apparatus.

FIG. 2 illustrates the reading units 112*a*, 112*b* and a main control board 207. "a" and "b" attached to the end of the reference signs are attached to help distinguish between the constituent elements of the reading units 112*a*, 112*b*. Thus, when an item which the reading units 112*a*, 112*b* have in common is being described, "a" and "b" are omitted from the reference signs.

Various electronic components required for reading a document are mounted on a printed circuit board 200 of the reading unit 112. A line sensor 201 is an image sensor including a plurality of photoelectric conversion elements (light-receiving elements) that read a document. For example, the line sensor 201 receives reflected light from a document illuminated by an LED 204, accumulates charge, and outputs the accumulation result as an analog image signal. The LED 204 is a light source. An analog front end (AFE 202) is an analog front end IC. IC stands for integrated circuit.

Figure 3:
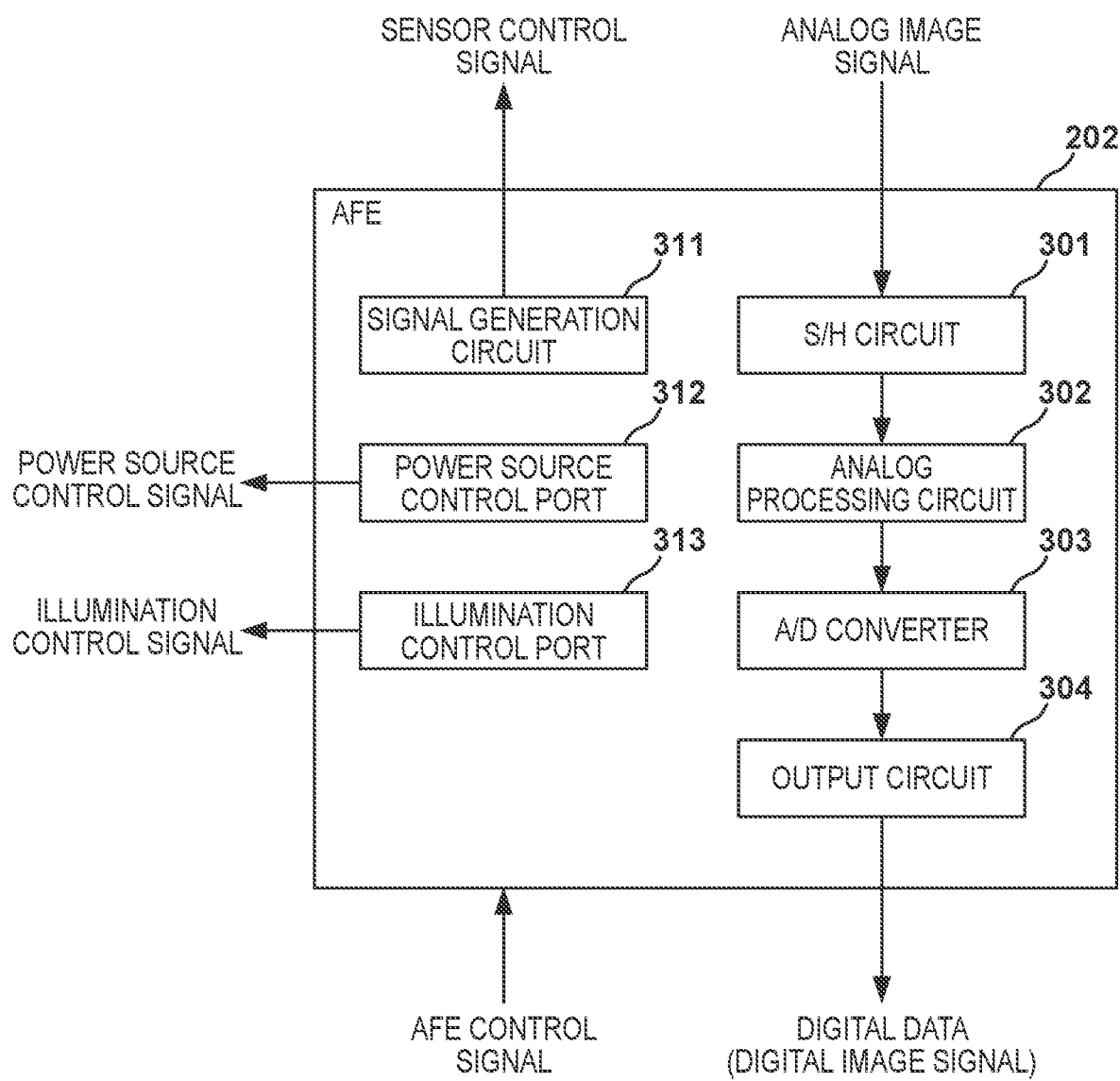
FIG. 3 is a block diagram of an AFE.

FIG. 3 illustrates the AFE 202 in detail. A sample and hold circuit (S/H circuit 301) samples and holds the analog image signal output from the line sensor 201 and outputs the sampled and held signal to an analog processing circuit 302. The analog processing circuit 302 applies an analog processing (for example, offset processing, gain processing, or the like) on the sampled and held signal and outputs the analog processed signal to an A/D converter 303. The A/D converter 303 converts the analog processed signal into a digital image signal and outputs the digital image signal to an output circuit 304. The output circuit 304 outputs the digital image signal to an image processing unit 210 of the main control board 207. A signal generation circuit 311, in accordance with a command from a CPU 208, generates a control signal (for example, an image clock or the like) for making the line sensor 201 execute a reading operation and supplies the control signal to the line sensor 201. A power source control port 312 controls the ON and OFF of a power source circuit 203 by outputting a power source control signal (H or L) in accordance with a command from the CPU 208. H stands for high level. L stands for low level. The power source circuit 203 is a circuit that supplies power to the line sensor 201. An illumination control port 313 controls the ON and OFF of the LED 204 via a lighting circuit 205 by outputting an illumination control signal (H or L) in accordance with a command from the CPU 208. The LED 204 is a light-emitting element that outputs illumination light for illuminating a document. The lighting circuit 205 generates a drive current for turning on the LED 204.

As illustrated in FIG. 2, the printed circuit board 200 is also provided with a temperature sensor 206. The temperature sensor 206 is a detector that measures the temperature of the line sensor 201 and outputs the measurement result (a voltage proportional to the temperature) to an ADC 209 of the CPU 208. ADC stands for analog digital converter. The ADC 209 converts the measurement result into digital data. The ADC 209 may be an IC provided external to the CPU 208. Because the measurement temperature and a threshold are compared, the CPU 208 may employ a comparator circuit instead of the ADC 209. A comparator circuit outputs, to the CPU 208, a comparison result indicating whether or not the measurement temperature (an output voltage of the temperature sensor 206) has reached a predetermined voltage.

Out of the plurality of electronic components mounted on the printed circuit board 200, the line sensor 201 is an electronic component that generates a relatively large amount of heat. Thus, the line sensor 201 is selected for measurement by the temperature sensor 206. The temperature sensor 206, for example, may be a surface-mount chip thermistor. The chip thermistor may be mounted near the output terminal of the line sensor 201. Also, the temperature sensor 206 is required to be provided at a position (near the line sensor 201) where it is able to measure the temperature of the line sensor 201, and the temperature sensor 206 may be not provided on the printed circuit board 200. The measurement target of temperature sensor 206 may be the LED 204. In this case, for example, a chip thermistor is mounted on the printed circuit board on which the LED 204 is mounted.

The main control board 207 is a printed circuit board on which the CPU 208 and the like are mounted. The CPU 208 is a processor circuit that controls the ADF 110 and the image reader 111. Also, the CPU 208 controls the reading unit 112 via the AFE 202. The CPU 208 and the AFE 202 are connected by a signal line. The CPU 208, via the signal line, transmits control signals to the AFE 202, receives control results and the like (for example, temperature data) from the AFE 202, and the like. When the CPU 208 transmits a control command instructing the AFE 202 to execute reading, the logic of the power source control port 312 changes from L to H and the power source circuit 203 starts supplying power. In a similar manner, when the logic of the illumination control port 313 is changed from L to H, the lighting circuit 205 starts supplying a drive current to the LED 204.

In a case in which a thermistor is employed as the temperature sensor 206b, via simulation or experiment, the relationship (lookup table) between the digital value, which is the thermistor output, and the temperature may be acquired and stored in a non-volatile memory of the CPU 208. The CPU 208 acquires the temperature corresponding to the thermistor output by referencing the lookup table. Because the temperature sensor 206 is directly connected to the ADC 209, the CPU 208 can acquire temperature information at a discretionary timing.

The document placement sensor 116 is connected to the CPU 208. The CPU 208 determines whether or not a document is placed on the document tray 101 on the basis of the output of the document placement sensor 116.

In the feed reading mode, the CPU 208 acquires the temperature during the period of time between the timing when a preceding document is finished being read and a timing when a following document is started being read. In the case in which the temperature is greater than or equal to a threshold, the CPU 208 stops feeding the document. Also, to reduce the rise in temperature of the reading unit 112, the CPU 208 turns off the LED 204, stops supplying power to the line sensor 201, stops outputting a control signal from the APE 202, and stops operation of the A/D converter 303 of the AFE 202.

Then, when a predetermined amount of time has elapsed from when the feeding and reading of the document was stopped, the CPU 208 restarts the feeding and reading of the document.

A timer 220 is a timer that measures the amount of time that document reading is stopped. A motor 230 is a drive that drives a conveyance roller such as the pickup roller 102. The motor 230 that drives the registration roller 104 and the motor 230 that drives the other conveyance rollers may be different motors.

As illustrated in FIG. 2, the image processing unit 210 is mounted on the main control board 207. The image processing unit 210 is an image processing IC. The image processing unit 210 receives digital data (image data) output from the AFE 202, applies the shading correction coefficient to the image data, and executes shading correction. The image processing unit 210 includes an input interface for receiving image data from the AFE 202a and an input interface for receiving image data from the AFE 202b. The image processing unit 210 includes a single output interface for outputting image data. In the period of time during which image data input from the AFE 202a is being output, the image processing unit 210 stores the image data input from the AFE 202b in a page memory. When the output of the image data input from the AFE 202a is completed, the image processing unit 210 outputs the image data stored in the page memory. In this way, the image processing unit 210 alternately outputs the image data input from the AFE 202a and the image data input from the AFE 202b to the next circuit in the process.

Flowchart

Figure 4:
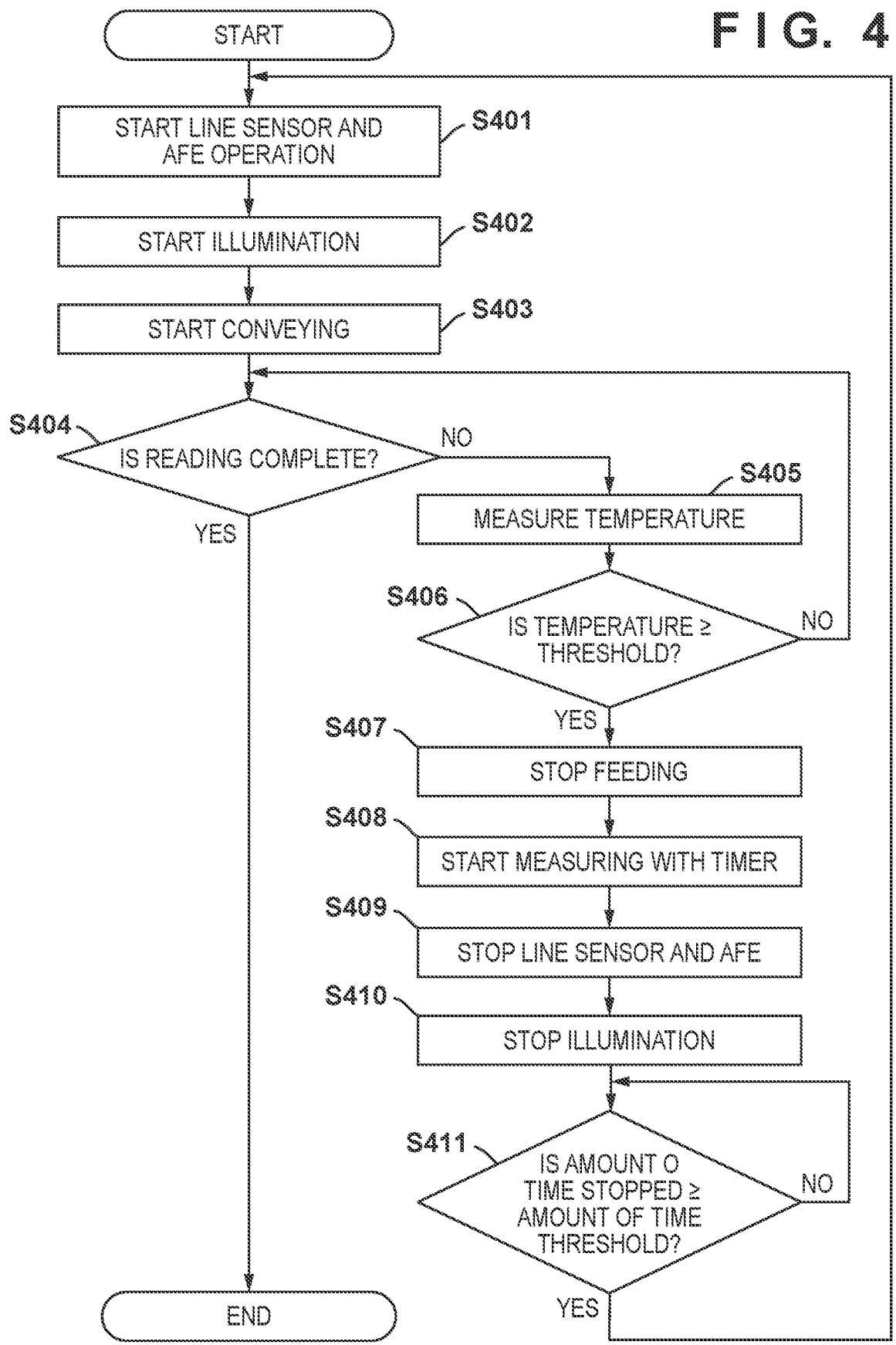
FIG. 4 is a flowchart illustrating a document reading process.

FIG. 4 is a flowchart illustrating document reading processing in the feed reading mode. When a document is detected by the document placement sensor 116 and a reading instruction is input by a user, the CPU 208 executes the following process.

In step S401, the CPU 208 actuates the line sensors 201a, 201b and the AFEs 202a, 202b, and thus activates the reading units 112a, 112b. For example, the CPU 208 communicates with the AFEs 202a, 202b and causes the AFEs 202a, 202b to activate the power source circuits 203a, 203b. The power source circuits 203a, 203b start supplying power to the line sensors 201a, 201b. The CPU 208 communicates with the AFEs 202a, 202b and causes the signal generation circuit 311 of the AFEs 202a, 202b to start outputting a control signal. Accordingly, the line sensors 201a, 201b transition from an inactive state to a state capable of reading the document. The CPU 208 communicates with the AFEs 202a, 202b and activates the S/H circuit 301, the analog processing circuit 302, the A/D converter 303, and the output circuit 304.

In step S402, the CPU 208 starts the illumination of the document by the LEDs 204a, 204b. For example, the CPU 208 communicates with the AFEs 202a, 202b, switches the lighting circuits 205a, 205b from OFF to ON, and turns on the LEDs 204a, 204b.

In step S403, the CPU 208 starts conveying the document by activating the motor 230. The motor 230 drives the pickup roller 102, the separation roller 103, the registration roller 104, the lead roller 106, and the like. This conveys the document on the document tray 101 toward the document read position of the reading units 112a, 112b.

In step S404, the CPU 208 determines whether document reading has ended (been completed). In the case in which document reading has ended, the CPU 208 stops the reading units 112a, 112b and ends the document reading processing. In the case in which document reading has not ended, the CPU 208 proceeds the processing to step S405.

In step S405, the CPU 208 measures the temperature of the line sensors 201a, 201b using the temperature sensors 206a, 206b. For example, the CPU 208 acquires temperature data via the ADC 209 converting from analog to digital the output signals from the temperature sensors 206a, 206b.

In step S406, the CPU 208 determines whether or not the measured temperature is greater than or equal to a temperature threshold. The temperature threshold is, for example, the upper limit of the operating temperature of the line sensors 201a, 201b. The CPU 208 determines whether or not the temperature measured by the temperature sensor 206a is greater than or equal to the temperature threshold and determines whether or not the temperature measured by the temperature sensor 206b is greater than or equal to the temperature threshold. Also, the CPU 208 determines whether or not at least one of the temperatures from among these two temperatures is greater than or equal to the temperature threshold. In the case in which both temperatures are less than the temperature threshold, the CPU 208 proceeds the processing to Step S404. However, in the case in which at least one of the two temperatures is greater than or equal to the temperature threshold, the reading units 112a, 112b are to be cooled, and thus the CPU 208 proceeds the processing to step S407.

In step S407, the CPU 208 stops feeding the document, which is placed on the document tray 101, following the document being conveyed. Note that the CPU 208 continues the reading of the preceding document being conveyed.

When the reading of the preceding document has been completed, in step S408, the CPU 208 starts the measurement by the timer 220 of the amount of time stopped. The amount of time stopped may be understood as the cooling time of the reading units 112a, 112b.

In step S409, the CPU 208 stops the operation of the line sensors 201a, 201b and the AFEs 202a, 202b. Though the line sensors 201a, 201b may be stopped, in this example, the AFEs 202a, 202b are also stopped. In some cases, the AFEs 202a, 202b are disposed near the line sensors 201a, 201b, respectively. In such cases, when the AFEs 202a, 202b operate, the cooling of the line sensors 201a, 201b may be hindered. Thus, both the line sensors 201a, 201b and the AFEs 202a, 202b are stopped.

In step S410, the CPU 208 stops the illumination of the document by turning off the LEDs 204a, 204b. In some cases, the LEDs 204a, 204b and the lighting circuits 205a, 205b are disposed near the line sensors 201a, 201b, respectively. In such cases, the cooling of the line sensors may be hindered by the LEDs 204a, 204b and the lighting circuits 205a, 205b. Thus, the CPU 208 stops the lighting circuits 205a, 205b and turns off the LEDs 204a, 204b.

In step S411, the CPU 208 determines whether the amount of time stopped measured by the timer 220 is greater than or equal to a predetermined amount of time (amount of time threshold). The amount of time threshold, for example, corresponds to the amount of time needed for the line sensors 201a, 201b to sufficiently cool (for the temperature of the line sensor 201 to reach a temperature Ts at which the line sensor 201 is able to start operation) and is determined via experiment or simulation. Also, the amount of time threshold, for example, is set to be less than the amount of time needed for the temperature detected by the temperature sensor 206 to decrease from the temperature threshold to the temperature Ts. However, in the present example, the amount of time threshold may be set to be less than the amount of time needed for the line sensors 201a, 201b to sufficiently cool. Accordingly, the reading of the document can be restarted in an early stage. When the amount of time stopped is greater than or equal to the amount of time threshold, the CPU 208 proceeds the processing to Step S401. In this way, the operation of the reading units 112a, 112b are restarted.

In this example, it is assumed that a first surface and a second surface of the document are read in a two-side reading process. However, the present example can be applied to a configuration in which the reading unit 112a reads one surface of the document. The processing is the same, just with the processing relating to the reading unit 112b being omitted.

According to the present example, when the measurement temperature measured by the temperature sensor 206 is greater than or equal to the temperature threshold, the reading unit 112 is stopped. Also, when the amount of time stopped of the reading unit 112 is greater than or equal to a predetermined amount of time, the reading operation of the reading unit 112 is restarted. In this way, the restart timing of the operation of the reading unit is determined on the basis of the amount of time stopped of the reading unit 112, and not the temperature detected by the temperature sensor 206. Thus, a decrease in the productivity of the document reading apparatus can be minimized or prevented.

In this example, it is assumed that the restrictions due to the specifications relating to the operating temperature that the line sensor 201 is able to operate at are more restrictive than the restrictions relating to the other electronic components. However, in the case in which a restriction due to the specifications relating to the operating temperature that another electronic component is able to operate at is more restrictive, this electronic component is taken as the target for temperature monitoring, rather than the line sensor 201.

From among the plurality of electronic components mounted on the reading unit 112, the IC package size of the line sensor 201 is relatively large, and thus the heat capacity is also relatively large. On the other hand, when multiple documents are continuously read, the APE 202 and the lighting circuit 205, not the line sensor 201, gets hot, increasing the overall temperature of the reading unit 112. In this case, the temperature of the line sensor 201 decreases gradually.

Figure 5:
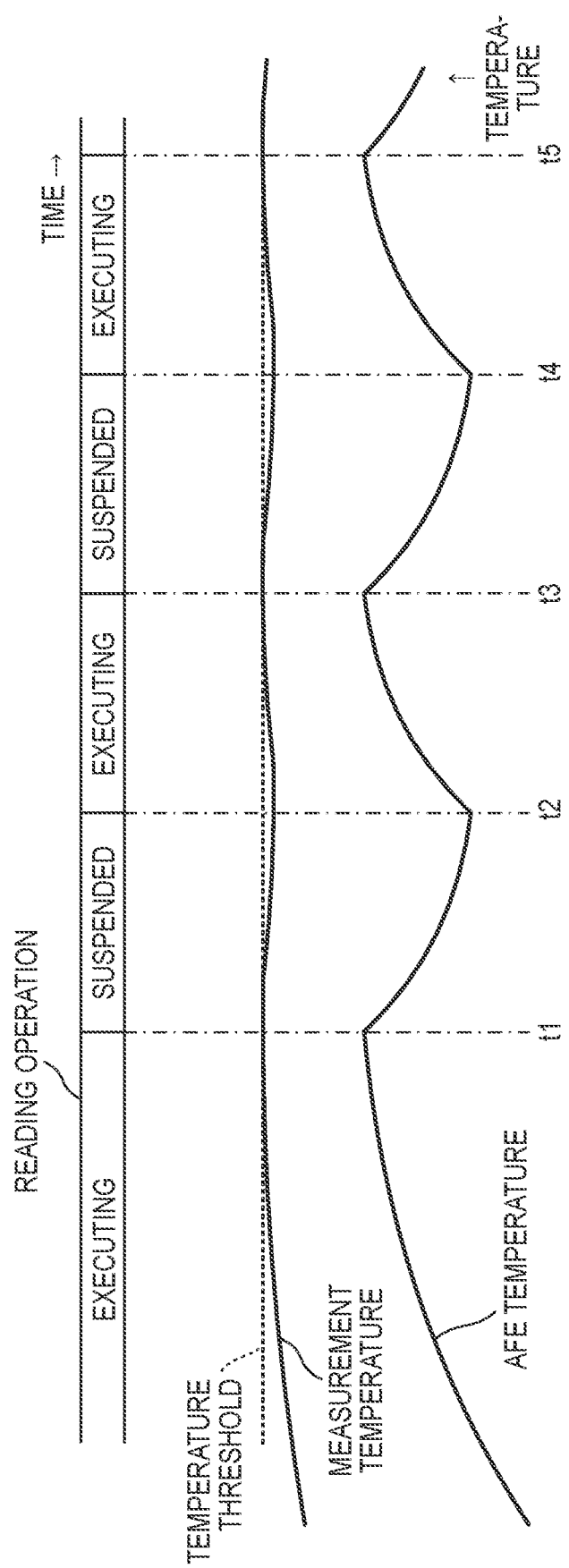
FIG. 5 is a diagram for describing the relationship between reading operation and temperature change.

FIG. 5 illustrates, using an example, the relationship between a reading operation and temperature change. Here, whether a reading operation of the reading unit 112a is being executed or stopped is illustrated. Also, the measurement result (measurement temperature) of the temperature sensor 206*a* and the actual temperature of the AFE 202*a* are illustrated. The horizontal axis direction indicates the passing of time. The vertical axis direction indicates the temperature. The timing of change in the reading operation is illustrated in the time between time t1 and time t5.

When a reading operation is being executed, the measurement temperature and the temperature of the APE 202*a* increases. The dotted line illustrates the temperature threshold. At time t1, the measurement temperature reaches the temperature threshold. In response, the reading operation of the reading unit 112*a* is stopped (suspended). Compared to the line sensor 201*a*, the AFE 202*a* is a small-sized IC, and thus the heat capacity of the AFE 202*a* is relatively small. Accordingly, the temperature of the AFE 202*a* quickly decreases. In comparison, due to the reason described above, the measurement temperature of the temperature sensor 206*a* has low temperature followability. From the time t1 to approximately the time t2, the measurement temperature of the temperature sensor 206*a* very gradually decreases.

For the restart condition of the reading operation, as in Japanese Patent Laid-Open No. 2007-110609, it is assumed that the measurement temperature of the temperature sensor 206*a* being less than or equal to a predetermined temperature is employed. In this case, the predetermined temperature is set to be lower than the temperature threshold. The amount of change in the measurement temperature is low compared to the amount of change in the temperature of the AFE 202*a*. Thus, the amount of time needed for the measurement temperature to be less than or equal to the predetermined temperature tends to be large. As a result, the reading is stopped for a large amount of time. As the user is to wait for a long time until the reading of multiple documents has been completed, usability is decreased.

In the present example, as the stop release condition of the reading operation, the amount of time stopped being greater than or equal to the amount of time threshold is employed. Accordingly, the waiting time of the user is decreased. Note that, to restart the reading operation in an early stage, next, the amount of time needed for the measurement temperature to reach the temperature threshold may be shortened. However, in the case in which there are sufficiently few sheets of the document remaining in the document tray 101, the reading of all of the documents may be completed before the measurement temperature next reaches the temperature threshold. Also, because the amount of time stopped is shortened, the user will feel that the decrease in the speed at which documents are read is less.

Embodiments Derived from Examples

The pickup roller 102 functions as a conveyance unit that conveys the document along the conveyance path. The LED 204 functions as an illumination unit that illuminates the document conveyed along the conveyance path. The LED 204 functions as a light source configured to emit light. The LED 204 is provided on a substrate. The reading unit 112 and the line sensor 201 function as a reading unit that reads the document conveyed along the conveyance path. That is, the sensor includes a light-receiving element that receives light emitted from the light source and reflected by the document conveyed along the conveyance path by the conveyance unit. The temperature sensor 206 functions as a detection unit (detector) that detects the temperature of the illumination unit or the reading unit. The CPU 208 functions as one or more processors that control the illumination unit and the reading unit and stop the illumination unit and the reading unit when the temperature detected by the detection unit is greater than a threshold. The timer 220 functions as a time measurement unit that measures the amount of time stopped of the illumination unit and the reading unit. The CPU 208 is configured to reactivate the illumination unit and the reading unit when the amount of time stopped measured by the time measurement unit is greater than a predetermined amount of time. In this way, the waiting time of the user, due to a temperature increase in the document reading apparatus 100, is decreased. Also, the predetermined amount of time is constant, thus a user can expect to wait a certain amount of time, the amount of time not being dependent on the installation environment of the document reading apparatus 100. Accordingly, a decrease in the productivity of the document reading apparatus can be minimized or prevented. The one or more processors may be further configured, in a case where a predetermined amount of time has elapsed from when the one or more processors controls the light source not to emit the light, to control the light source to emit the light and to start conveyance of the document by the conveyance unit, regardless of a detection result of the detector. The one or more processors may be configured, in a case where a predetermined amount of time has elapsed from when the one of more processors stops supply of power to the sensor, to activate the sensor by activating the power source circuit and to start conveyance of the document by the conveyance unit, regardless of a detection result of the detector.

The illumination unit may include a first light source (for example, the LED 204*a*) that illuminates the first surface of the document conveyed along the conveyance path and a second light source (for example, the LED 204*b*) that illuminates the second surface of the document conveyed along the conveyance path. The reading unit may include a first image sensor (for example, the line sensor 201*a*) that reads the first surface of the document conveyed along the conveyance path and a second image sensor (for example, the line sensor 201*b*) that reads the second surface of the document conveyed along the conveyance path. The detection unit may include a first temperature sensor (for example, the temperature sensor 206*a*) that detects the temperature of the first light source or the first image sensor and a second temperature sensor (for example, the temperature sensor 206*b*) that detects the temperature of the second light source of the second image sensor. There are cases when the temperature detected by the first temperature sensor is greater than the threshold and cases when the temperature detected by the second temperature sensor is greater than the threshold. In such cases, the CPU 208 turns off the first light source and the second light source and stops the first image sensor and the second image sensor. When the amount of time stopped measured by the time measurement unit is greater than a predetermined amount of time, the CPU 208 turns on the first light source and the second light source and reactivates the first image sensor and the second image sensor. Accordingly, the reading of the document can be restarted in an earlier stage compared to conventional technologies.

The CPU 208 may stop the conveyance unit (for example, the motor 230) when the temperature detected by the detection unit is greater than a threshold. The CPU 208 may reactivate the conveyance unit when the amount of time stopped measured by the time measurement unit is greater than a predetermined amount of time. Because the conveyance unit is also a source of heat, by stopping the conveyance unit, the cooling of the reading unit is accelerated.

The AFE 202 is an example of a conversion unit that converts the analog image signal output from the reading unit into digital data. The CPU 208 may stop the conversion unit when the temperature detected by the detection unit is greater than a threshold. The CPU 208 may reactivate the conversion unit when the amount of time stopped measured by the time measurement unit is greater than a predetermined amount of time. Because the conversion unit is also a source of heat, by stopping the conversion unit, the cooling of the reading unit is accelerated.

The power source circuit 203 functions as a power source circuit that supplies power to the reading unit. The CPU 208 may be configured to stop the reading unit by stopping the power source circuit. Because the power source circuit is also a source of heat, by stopping the power source circuit, the cooling of the reading unit is accelerated.

The lighting circuit 205 functions as a lighting circuit that turns on the illumination unit by supplying a current to the illumination unit. The CPU 208 may stop the illumination unit by stopping the lighting circuit. Because the lighting circuit is also a source of heat, by stopping the lighting circuit, the cooling of the reading unit is accelerated.

The LED 204a is an example of a first light source that illuminates the first surface of the document conveyed along the conveyance path. The LED 204b is an example of a second light source that illuminates the second surface of the document conveyed along the conveyance path. The line sensor 201a is an example of a first image sensor that reads the first surface of the document conveyed along the conveyance path. The line sensor 201b is an example of a second image sensor that reads the second surface of the document conveyed along the conveyance path. The temperature sensor 206a is an example of a first temperature sensor that detects the temperature of the first light source of the first image sensor. The temperature sensor 206b is an example of a second temperature sensor that detects the temperature of the second light source of the second image sensor. The CPU 208 is an example of one or more processors that turn off the first light source and the second light source and stop the first image sensor and the second image sensor on the basis of the temperature detected by the first temperature sensor and the temperature detected by the second temperature sensor. The timer 220 is an example of a time measurement unit that measures the amount of time stopped of the first light source, the second light source, the first image sensor, and the second image sensor. There are cases when the temperature detected by the first temperature sensor is greater than the threshold and cases when the temperature detected by the second temperature sensor is greater than the threshold. In such cases, the CPU 208 turns off the first light source and the second light source and stops the first image sensor and the second image sensor. When the amount of time stopped measured by the time measurement unit is greater than a predetermined amount of time, the CPU 208 turns on the first light source and the second light source and reactivates the first image sensor and the second image sensor. Accordingly, the waiting time of the user is decreased.

When the temperature detected by the first temperature sensor is greater than the threshold or when the temperature detected by the second temperature sensor is greater than the threshold, the CPU 208 may stop the conveyance unit. The CPU 208 may reactivate the conveyance unit when the amount of time stopped measured by the time measurement unit is greater than a predetermined amount of time.

The AFE 202a is an example of a first conversion unit that converts the analog image signal output from the first image sensor into digital data. The AFE 202b is an example of a second conversion unit that converts the analog image signal output from the second image sensor into digital data. When the temperature detected by the first temperature sensor is greater than the threshold or when the temperature detected by the second temperature sensor is greater than the threshold, the CPU 208 may stop the first conversion unit and the second conversion unit. The CPU 208 reactivates the first conversion unit and the second conversion unit when the amount of time stopped measured by the time measurement unit is greater than a predetermined amount of time.

The power source circuit 203a is an example of a first power source circuit that supplies power to the first image sensor. The power source circuit 203b is an example of a second power source circuit that supplies power to the second image sensor. The CPU 208 stops the first image sensor by stopping the first power source circuit and stops the second image sensor by stopping the second power source circuit.

The lighting circuit 205a is an example of a first lighting circuit that turns on the first light source by supplying power to the first light source. The lighting circuit 205b is an example of a second lighting circuit that turns on the second light source by supplying power to the second light source. The CPU 208 stops the first light source by stopping the first lighting circuit and stops the second light source by stopping the second lighting circuit.

In the case in which the detection result of the document placement sensor 116 indicates that a document is placed on the document tray 101, the CPU 208 may execute stop determination. Stop determination is processing to determine whether to turn off the light source and whether to stop the image sensor. In the case in which the detection result of the document placement sensor 116 indicates that a document is not placed on the document tray 101, the CPU 208 may skip the stop determination and turn off the light source and stop the image sensor. For example, in the case of the latter, the CPU 208 may turn off the first light source and the second light source and stop the first image sensor and the second image sensor without acquiring the temperature detected by the first temperature sensor and the temperature detected by the second temperature sensor. In this way, the stop determination is executed when there is a following document present. In other words, the stop determination is executed in the period of time from after the reading of the preceding document has been completed to before the conveying of the following document has been started. As a result, document reading is not suspended while document reading is being executed (in other words, a document is left on the conveyance path).

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-204882, filed Nov. 12, 2019 which is hereby incorporated by reference herein in its entirety.

What is claimed is:

1. A document reading apparatus comprising:
a conveyance unit configured to convey a document to a reading position;
a light source configured to emit light;
a substrate on which the light source is provided;
a sensor configured to read the conveyed document at the reading position; and
a detector provided on the substrate, and configured to detect a temperature,
wherein the light source stops emitting the light and the conveyance unit does not convey a first document to the reading position in a case where the temperature detected by the detector is greater than a threshold in a state where a second document followed by the first document is being read by the sensor, and
wherein the light source emits the light and the conveying unit conveys the first document to the reading position regardless of a detection result of the detector in a case where a predetermined amount of time has elapsed from when the light source stops emitting the light.

2. The document reading apparatus according to claim 1, further comprising:
a lighting circuit configured to turn on the light source by supplying a current to the light source, and
one or more processors configured to stop the lighting circuit, thereby the light source stops emitting the light, and
to drive the lighting circuit, thereby the light source emits the light.

3. The document reading apparatus according to claim 1, further comprising:
a reading unit including a transparent member on which the document is to be placed, the light source, the substrate, the detector, and the sensor,
wherein the sensor is configured to read the document placed on the transparent member.

4. The document reading apparatus according to claim 1, wherein in the case where the temperature detected by the detector is greater than the threshold in the state where the second document is being read by the sensor, the light source stops emitting the light after reading the second document by the sensor has finished.

5. A document reading apparatus comprising:
a conveyance unit configured to convey a document to a reading position;
a light source configured to emit light;
a sensor configured to read the conveyed document at the reading position;
a power source circuit configured to supply power to the sensor;
a substrate on which the sensor is provided;
a detector provided on the substrate, and configured to detect a temperature; and
one or more processors,
wherein the one or more processors is configured to stop operation of the sensor by stopping the power source circuit and the conveyance unit does not convey a first document to the reading position in a case where the temperature detected by the detector is greater than a threshold in a state where a second document followed by the first document is being read by the sensor,
wherein the one or more processors is configured to activate the sensor by activating the power source circuit and the conveying unit conveys the first document to the reading position regardless of a detection result of the detector in a case where a predetermined amount of time has elapsed from when the one or more processors stops supply of power to the sensor.

6. The apparatus according to claim 5, further comprising a converter configured to convert an analog signal output from the sensor into a digital signal,
wherein the one or more processors is configured to stop operating of the converter in the case where the temperature detected by the detector is greater than the threshold in the state where the second document is being read by the sensor, and configured to start operating of the converter regardless of the detection result of the detector in the case where the predetermined amount of time has elapsed from when the one or more processors stop supply of power to the sensor.

7. The apparatus according to claim 6, wherein the converter is provided on the substrate.

8. The document reading apparatus according to claim 5, further comprising a reading unit including a transparent member on which the document is to be placed, the light source, the substrate, the detector, and the sensor,
wherein the sensor is configured to read the document placed on the transparent member.

9. The document reading apparatus according to claim 5, wherein in the case where the temperature detected by the detector is greater than the threshold in the state where the second document is being read by the sensor, the one or more processors is configured to stop operation of the sensor by stopping the power source circuit after reading the second document by the sensor has finished.

10. A document reading apparatus comprising:
a conveyance unit configured to convey a document to a reading position;
a light source configured to emit light;
a sensor configured to read the conveyed document at the reading position;
a driving circuit configured to output a clock signal which drives the sensor;
a substrate on which the sensor is provided; and
a detector provided on the substrate, and configured to detect a temperature,
wherein the driving circuit stops outputting the clock signal and the conveyance unit does not convey a first document to the reading position in a case where the temperature detected by the detector is greater than a threshold in a state where a second document followed by the first document is being read by the sensor, wherein the driving circuit starts outputting the clock signal and the conveying unit conveys the first document to the reading position regardless of a detection result of the detector in a case where a predetermined amount of time has elapsed from when the driving circuit stops outputting the clock signal.

11. The apparatus according to claim 10, further comprising
a converter configured to convert an analog signal output from the sensor into a digital signal, and
one or more processors configured to stop operating of the converter in the case where the temperature detected by the detector is greater than the threshold in the state where the second document is being read by the sensor, and
configured to start operating of the converter regardless of the detection result of the detector in the case where the predetermined amount of time has elapsed from when the driving circuit stops outputting the clock signal.

12. The apparatus according to claim 11, wherein the converter is provided on the substrate.

13. The document reading apparatus according to claim 10, further comprising a reading unit including a transparent member on which the document is to be placed, the light source, the substrate, the detector, and the sensor,
wherein the sensor is configured to read the document placed on the transparent member.

14. The document reading apparatus according to claim 10, wherein in the case where the temperature detected by the detector is greater than the threshold in the state where the second document is being read by the sensor, the driving circuit stops outputting the clock signal after reading the second document by the sensor has finished.

15. A document reading apparatus comprising:
a conveyance unit configured to convey a document to a reading position;
a light source configured to emit light;
a sensor configured to read the conveyed document at the reading position;
a converter configured to convert an analog signal output from the sensor into a digital signal;
a substrate on which the converter is provided;
a detector provided on the substrate, and configured to detect a temperature, and
one or more processors;
wherein the one or more processors configured to stop operating of the converter and the conveyance unit does not convey a first document to the reading position in a case where the temperature detected by the detector is greater than a threshold in a state where a second document followed by the first document is being read by the sensor,
wherein the one or more processors configured to start operating of the converter and the conveying unit conveys the first document to the reading position regardless of a detection result of the detector in a case where a predetermined amount of time has elapsed from when the one or more processors stops the operating of the converter.

16. The document reading apparatus according to claim 15, further comprising a reading unit including a transparent member on which the document is to be placed, the light source, the substrate, the detector, and the sensor,
wherein the sensor is configured to read the image of the document placed on the transparent member.

17. The document reading apparatus according to claim 15, wherein in the case where the temperature detected by the detector is greater than the threshold in the state where the second document is being read by the sensor, the one or more processors is configured to stop operating of the converter after reading the second document by the sensor has finished.

* * * * *